United States Patent [19]

Short et al.

[11] Patent Number: 4,538,296

[45] Date of Patent: Aug. 27, 1985

[54] SOUND INHIBITOR FOR AUDIO TRANSDUCERS

[76] Inventors: Robert S. Short, 24 Cornell Way, Hopatcong, N.J. 07843; Mark S. Utter, 24 Lenape Dr., Montville, N.J. 07045

[21] Appl. No.: 516,040

[22] Filed: Jul. 22, 1983

[51] Int. Cl.[3] .......... H02H 1/04

[52] U.S. Cl. .......... 381/72; 361/75; 361/89

[58] Field of Search .......... 361/91, 88, 89, 100, 361/71, 74, 75, 33; 381/55, 56, 57, 72, 74, 94, 107

[56] References Cited

U.S. PATENT DOCUMENTS

| | | | |
|---|---|---|---|
| 3,544,720 | 12/1970 | Corderman | 381/55 |
| 3,602,773 | 8/1971 | Berstein | 361/74 |
| 3,731,153 | 5/1973 | Nishimoto | 361/89 |
| 3,890,465 | 6/1975 | Kaizu | 361/91 |
| 3,904,931 | 9/1975 | Leidich | 361/91 |
| 3,925,708 | 12/1975 | Picciochi | 361/71 |
| 3,959,735 | 5/1976 | GrosJean | 381/55 |
| 3,959,736 | 5/1976 | GrosJean | 381/55 |
| 3,962,607 | 6/1976 | Burns | 361/91 |
| 3,965,295 | 6/1976 | Evans | 381/55 |
| 3,979,644 | 9/1976 | Everhart | 361/91 |
| 3,988,695 | 10/1976 | Mattfeld | 361/91 |
| 4,019,096 | 4/1977 | Bullinga | 361/75 |
| 4,034,268 | 7/1977 | Klauck | 361/88 |
| 4,173,740 | 11/1979 | Nagata | 361/91 |
| 4,224,470 | 9/1980 | Persson | 381/72 |
| 4,447,844 | 5/1984 | Schossow | 361/88 |

FOREIGN PATENT DOCUMENTS

| | | | |
|---|---|---|---|
| 2933010 | 2/1981 | Fed. Rep. of Germany | 381/55 |
| 904068 | 7/1982 | U.S.S.R. | 361/89 |

*Primary Examiner*—Gene Z. Rubinson

*Assistant Examiner*—L. C. Schroeder

[57] ABSTRACT

A protection circuit for limiting the sound pressure level provided by transducer loads, such as headphones, in which there is provided interconnections between the input to the transducer load and the transducer load such that when loudness exceeds a predetermined limit, the connection to the transducer load is opened and the circuit turns off the audio signal to the transducer load and optionally illuminates an LED. After a predetermined time interval, the circuit automatically resets; however, if the sound pressure level has not been reduced below the predetermined limit, the circuit again immediately turns off the audio signal to the transducer load and this is continued until such time as the sound pressure level is reduced below the predetermined limit.

21 Claims, 4 Drawing Figures

SOUND INHIBITOR FOR AUDIO TRANSDUCERS

This invention relates to a circuit for limiting the noise or sound pressure level provided by transducer loads, particularly headphones and, more particularly, to a protection circuit which can prevent ear damage caused by listening to headphones or audio transducers at excessively loud sound levels.

BACKGROUND OF THE INVENTION

A variety of circuits have been provided for protecting loudspeakers from overload currents. Such circuits generally operate by limiting the current flowing to the loudspeaker or by cutting off the current entirely, such as by incorporating a circuit breaker or fuse between the amplifier and the loudspeaker. U.S. Pat. Nos. 4,301,330; 4,330,686; 4,276,442; 3,965,295 and 3,549,808 are examples of patents which claim such circuits. None of the circuits disclosed in these patents have means for automatic resetting. U.S. Pat. No. 3,925,708 claims an overload protection circuit for an audio speaker system which does have means for automatic resetting; however speaker protection according to this option is from excess wattage, not excess volume.

We are not aware of any protection circuit which is available to limit the sound pressure level provided by transducer loads, particularly headphones, as a function of excess volume. There is a need for a circuit that protects the listener from excessive decibels. Substantial ear damage is caused by listening to music at excessively loud sound levels. Additionally, a number of municipalities have banned headphones in public streets because they create a safety hazard when used by pedestrians and vehicle operators.

None of the circuits described in the above listed patents are designed for use to limit sound pressure levels of headphones. Indeed none of the circuits described would be adaptable for such use for the sole reason that they are not simple enough to be able to be used in a low cost, compact, light weight attachment for an audio source, such as a portable cassette player or tuner equipped with headphones.

It is accordingly an object of the invention to provide a novel protection circuit for limiting the sound pressure level provided by transducer loads, particularly headphones.

It is another object of the invention to provide a protection circuit for limiting the sound pressure level provided by transducer loads, particularly headphones which is simple in construction and can be manufactured at low cost and is compact and light weight.

Another object of the invention is to provide a protection circuit for limiting the sound pressure level provided by transducer loads, such as headphones, which guides the user to adjust the volume to a safe listening level and also enables the user to maintain a safe degree of environmental awareness.

Still another objective of the invention is, in combination with the above stated objectives, to provide such a protection circuit with automatic reset capability.

Other objects and advantages of the invention will be apparent from the following description.

SUMMARY OF THE INVENTION

It has been found that the objects of the invention are obtained by providing a protection circuit for limiting the sound pressure level provided by a transducer load, but otherwise not interfering with the flow of audio signal current to said transducer load, comprising audio signal prevention means to immediately prevent audio signal current from reaching the transducer load, which includes means to sense voltage applied to the transducer load, means to increase said voltage, and means to use said increased voltage when it exceeds a predetermined level to immediately prevent the audio signal current from reaching the transducer load; audio signal reestablishment means to reestablish the audio signal current to the transducer load after a fixed interval of time; audio signal reprevention means to again prevent the audio signal current from reaching the transducer load in the event that said increased voltage still exceeds said predetermined level; and means to repeat the functions described above sequentially until said increased voltage does not exceed said predetermined level at which time said audio signal is allowed to reach the transducer load.

In another embodiment of the invention, no voltage increasing means is employed. The objects of the invention in this embodiment are obtained by providing a protection circuit as described above without the voltage increasing means and including an RC timing network which when triggered serves to interrupt the flow of audio signal to the transducer load for a predetermined length of time.

In still another embodiment of the invention, the means to prevent the audio signal from reaching the transducer load includes means for shorting said audio signal before it reaches the transducer load and providing a substitute load.

DETAILED DESCRIPTION OF THE INVENTION AND THE PREFERRED EMBODIMENTS

Figure 1:
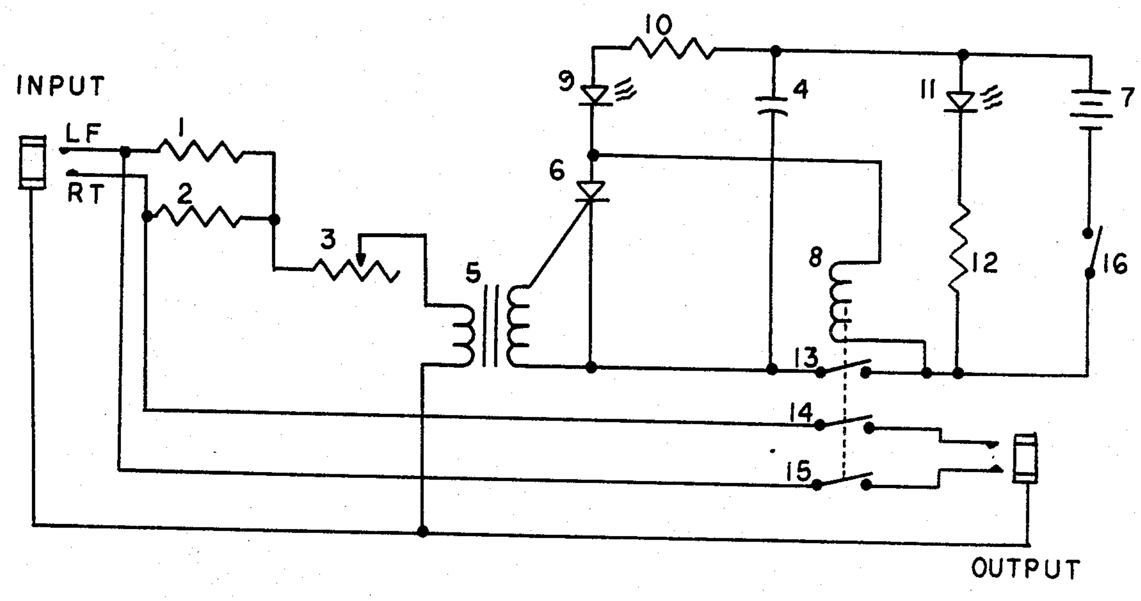
FIG. 1 shows the preferred embodiment of a protection circuit in accordance with the invention, in which a step-up transformer voltage increasing means is employed.

In the preferred embodiment of FIG. 1, the transducer load is a pair of micro-headphones. In operation, during normal listening levels, the audio signal current from a radio or tape cassette amplifier passes through the circuit and to the left (LF) and right (RT) earpieces of the headphones unaffected. Both left and right channels from the audio source are simultaneously fed through a voltage increasing means. In the embodiment of FIG. 1, the voltage increasing means is a step-up transformer 5, but any other voltage increasing means, such as an amplifier may also be used. If an amplifier is used the signal is then fed from the amplifier directly to a capacitor. When a step-up transformer is employed, a capacitor in the circuit at this point is not required. The impedance value of the transformer is so high relative to that of the headphones that the effect on the audio signal is insignificant.

Normal operation permits the audio signal to pass through relay contacts 14 and 15 which remain closed to allow the signal to flow unaltered. As the volume of the audio source is turned up, more voltage is fed through the primary side of transformer 5. On the secondary side of the transformer is a semiconductor switch that is electronically "open" during normal listening but which switches closed to activate the relay 8 at a voltage level above a predetermined level, thereby preventing the audio signal from reaching the headphones. (Alternatively, such audio signal prevention means can include means for shorting the audio signal before it reaches the headphones.) In the embodiment of FIG. 1, the semiconductor switch is a silicon control rectifier (SCR) 6. The voltage at which the SCR closes is internally fixed and unique to this particular component. The fact that the SCR is "open" until it is electronically excited with enough voltage means it has no effect on the audio level to the headphones during normal listening.

The remaining components of the trigger circuit include a battery 7, capacitor 4, resistor 10, and optionally a light emitting diode (LED) 9. The LED, if employed, is controlled by the SCR, and remains unexcited until the trigger level voltage of the SCR is reached. Thus, during sound pressure levels below the predetermined voltage limit, the LED does not light nor affect the audio signal.

In parallel with the SCR, the LED and the resistor is the capacitor 4 and the transistor battery 7. When the protective circuit of the invention is turned on, the battery charges the capacitor to the designed voltage D.C., (9 volts according to this preferred embodiment), but nothing further happens unless the volume is turned up. If the volume reaches the predetermined level, e.g. 85 decibels or higher, the voltage through the transformer 5 will be stepped up so it is high enough to trigger the SCR switch 6 on the secondary side of the transformer. When this predetermined sound pressure level associated voltage (trigger voltage level) is reached and the SCR switches to complete the trigger circuit, a number of things happen instantaneously. Most importantly to the listener, the trigger circuit completely turns off the audio signal to the headphones and the potentially damaging volume of sound is silenced. Simultaneously, if employed, the light emitting diode (LED) 9 lights up to indicate that the sound pressure level would be greater than the predetermined limit if the protective circuit of the invention were not used.

The audio signal is cut off because SCR 6 was activated and opened relay contacts 14 and 15 through which the sound had been flowing. The SCR can remain in this closed condition because the capacitor 4 discharges into SCR 6 and provides the transistor with enough current to remain closed. Once the capacitor is fully discharged the SCR 6 switches open and LED 9, if employed, is turned off. The rate at which the capacitor discharges is controlled by the resistor 10 and the capacitance of capacitor 4. With the capacitor fully discharged, SCR 6 switches off the trigger circuit and again monitors the voltage level out of transformer 5. Capacitor 4 begins to charge up again because it is in parallel with the battery 7. If the audio voltage to SCR 6 is still in excess of the internally fixed trigger level or predetermined limit, SCR 6 immediately switches to close the trigger circuit and the signal to the headphones is interrupted or prevented. This cycle will repeat until the volume of the audio source has been turned down to less than the predetermined limit. At no time does the listener using the protective circuit of the invention experience a sound pressure level above the predetermined limit. 85 Decibels is the preferred limit since many sources (including OSHA regulations) define 85 decibels as the level beyond which ear damage can occur.

The step-up transformer 5 serves to amplify the signal (increase the voltage) and isolate SCR 6 from the audio signal path. The first consideration for selection of the transformer is that the primary side of the transformer which is connected to the audio signal must not "load" the output of the audio source to the extent that it changes the volume of the headphones. The general rule is that for one device not to load down or affect another device (the headphones in this case), its value should be at least ten times the value of the other components. In an illustrative design according to the embodiment under consideration, the impedance of the headphone is about 32 ohms so the impedance on the primary side of the transformer must be at least 320 ohms.

The second consideration in choosing the transformer is that it must "step-up" or amplify the audio signal enough to trigger SCR 6 (with some headroom). In a preferred design according to the invention, standard 1000 ohm to 20,000 ohm transformers with a turns ratio from 2.5: 1 to 10:1 are preferred. The actual turns ratio selected will take into account the cost of the transformer, the size, the availability, and the trigger voltage required by the SCR. It is estimated the minimum voltage gain or amplification that could be considered acceptable is 2.5, or a transformer turns ratio of 2.5 to 1. Higher turns ratios than 10:1 would work if an SCR with a higher switching current and voltage were used. In the design under consideration a turns ratio of 4.5 to 1 is employed.

Relay switches 13, 14 & 15 isolate the triggering circuitry from the battery and disconnect the headphones without the disadvantage of using some type of audio signal limiting or compressor device. Audio limiting devices are complex and costly. Shorting the headphones could conceivably damage the circuitry in some radios, although additional circuitry can obviate the problem. In order to provide protection when the battery gets weak, "normally open" switch contacts are used on the relay. Thus when there is loss of battery power (relay off), there is no signal going to the headphones (contacts open). Standard mechanical relays may be used, but for reasons of cost, size, and rated life expectancy, the more reliable integrated circuit, solid state relays are preferred.

The relay switch is turned on and off according to volume level (or voltage level). This is accomplished by a device which can be triggered by AC current and be able to control DC current. Any transistor switch capable of doing this may be employed. In the embodiment shown, a silicon control rectifier (SCR) 6 is employed.

The trigger circuit must be able to sense both the left and right channels of the headphones because the volume controls on the audio source are often separate for each channel. The volume in one channel could be turned up above the predetermined limit and the other could be off completely. Under this condition it is desired that the protective circuit of the invention still turn the headphones off. Means is accordingly required for measuring both channels without merely combining the two signals. Combining the two signals would make the signal mono instead of stereo. The former is accomplished by isolating the channels with resistors 1 and 2 and then combining the signals. These resistors provide the isolation necessary between the left and right channels so the quality of sound is not adversely affected.

Optionally, the combined signals are fed into variable resistor or trimmer potentiometer 3 which is in series with the voltage isolating resistors 1 and 2 and the control terminal of the semiconductor. This affords a means of calibration or adjustment due to component tolerances. The variable resistor 3 changes the level of signal (audio voltage level) into the transformer 5 so that the audio signal interruption can be set at the desired predetermined audio voltage level (predetermined trigger point). The combined value of resistors 1, 2 and 3 determine the voltage level which is amplified by the transformer. Variable resistor 3 is not required for operation of the circuit, rather it is a manufacturing convenience and is optional.

The trigger circuit at this point consists of resistors 1, 2 and 3, transformer 5, SCR 6, and the relay 8. With only these components, the circuit will trigger, turn the relay off, open the headphones, and remain that way as long as there is DC current flowing through SCR 6. Thus a means for resetting is required (audio signal reestablishment means) as well as a means for audio signal reprevention and means for repeating these functions sequentially until the increased voltage does not exceed the predetermined level at which time the audio signal is allowed to reach the headphones.

SCR 6 can be reset by disconnecting battery 7 from the circuit using the contact 13 on relay 8. However, there must be a delay (fixed interval of time) in such action to make the circuit useful. Capacitor 4 is provided to supply the SCR 6 with current after battery 7 is disconnected. This gives the time delay needed to keep the headphones off for a brief time. The time constant of the RC network (resistor and capacitor) can be calculated by multiplying the resistance in ohms times the capacitance in farads. For the circuit illustrated in FIG. 1, a resistance of 2200 and a capacitance of 220 microfarads gives a time constant of about 0.5 seconds for the discharge of the capacitor. Since the SCR 6 and LED 9 require a certain amount of current to remain activated and will deactivate if the current falls below this level and the current decreases as the capacitor approaches the end of its discharge time, the actual reset time constant is somewhat less than the calculated value. If the capacitance of capacitor 4 is high the time constant discharge will be very long for the first discharge, but just as high capacitance value produces a longer discharge time constant rate, it also makes for a longer charge rate. If the capacitance of capacitor 4 is above 330 microfarads, we have found that the capacitor has a long discharge rate during its first operation, but as a subsequent charge and discharge is required in a very short time frame (under 0.1 seconds) the capacitor, being of higher capacitance and slower to change, does not fully charge and therefore discharges this stored energy quicker. Hence, the second, third, or fourth headphone disconnect in rapid succession will occur too rapidly to be of value to the protection circuit of the invention. A similiar problem is experienced with capacitance values 110 mF or under. A 220 mF capacitor works best in this embodiment of the invention, given the effect of the time constant charge and discharge cycle of the particular RC network used.

LED 9 is optional and may be added to give the user a visual indication that the circuit is working and that the battery has a charge. If employed the LED acts as a "load" when the SCR is triggered on. If the LED is omitted, the value of the resistor 10 in series, would need to be increased by 20-30% to continue proper operation.

Resistor 10, connected to the LED acts as a current limiter. It provides the current flow or regulation required by the specific type of LED employed. Since commercially available LEDs need from 2 to 20 milliamps (mA) to stay lit, the value of this resistor will change with a different LED. An LED that needs a lower value of milliamps to light will naturally require a higher value resistor.

The circuitry for the embodiment of FIG. 1 includes means for connecting two separate left and right audio signals from an amplifier output to a transducer load through normally open relay contacts 14 and 15; means for controlling said relay contacts such that closing the power switch 16 causes the relay contacts to close, thereby allowing audio signal to pass through said relay contacts to said transducer load; means for connecting said audio signal to voltage isolating resistors 1 and 2; means for coupling said audio signal to the control terminal of a voltage sensing semiconductor switch means so that exceeding a predetermined voltage level opens said relay so as not to permit passage of audio signal to said transducer load; timing means including an RC network in parallel with the anode and cathode of said semiconductor, thereby providing means to interrupt the audio signal through said relay contacts 14 and 15 for a predetermined time as determined by said RC network and DC power supply across said timing means and in series with said switch (16) contact and said relay contacts such that closing of the normally open switch (16) contact (preferably a mechanical switch) permits operation of the protective circuit and the timing means for controlling the length of the audio signal interruption.

The voltage increasing means is provided after isolating resistors 1 and 2 and is connected to the voltage sensing control terminal of the semiconductor switch 6.

The LED indicator light 9 is in series with said semiconductor switch and said timing circuit to indicate the conductive state of said semiconductor corresponding to and indicating the interruption of the audio signal.

The optional LED indicator light 11 is in series with said DC power supply and the switch (16) contacts to indicate the functional and operative state of the protective circuit and includes a resistor 12 and means for connecting said resistor in series with the indicator light, switch contact and the power supply to control current flow to said indicator light.

In a preferred mode, the timing means for preventing and reestablishing the audio signal flow includes a capacitor in parallel with said DC power supply and in series with said normally open power switch 16 contact, such that closing of said switch contact permits charging of said capacitor to the DC voltage potential of said power supply and means connecting said capacitor through a resistor and said semiconductor switch, thereby creating a voltage potential across said semiconductor such that when the semiconductor is turned on in response to the D.C. voltage potential and when the predetermined voltage trigger level is reached at the control terminal of the semiconductor, the semiconductor conducts the voltage potential of the capacitor for a time determined by the time constant associated with said RC network and thus interrupts the audio signal by opening said relay contact for the duration of the discharge of said capacitor.

Figure 2:
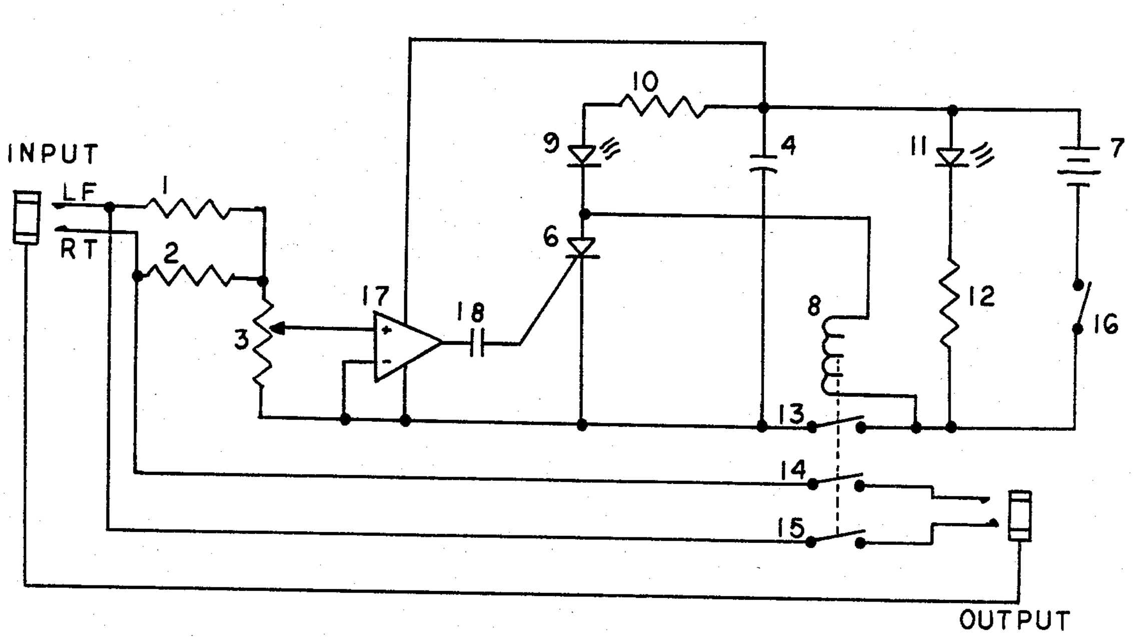
FIG. 2 shows an embodiment of the invention wherein an amplifier voltage increasing means is employed.

In the embodiment shown in FIG. 2, an amplifier 17, is employed to increase the voltage. Referring to FIG. 2, after the power switch 16 is turned on, the audio signal (voltage) is applied at inputs LF (left) and RT (right). In a similar fashion to the circuit shown in FIG. 1, the signal goes to resistors 1 and 2 which act to maintain separation of the left and right signals. These resistors also act to combine these two signals to be applied to variable resistor 3. Potentiometer 3 is the input level control for operational amplifier 17, whose gain is fixed internally. This gain, typically a value of 20, will depend on the particular type of amplifier used. A preferred type of amplifier is a transistor amplifier semiconductor. As the amplified signal leaves 17, it passes through capacitor 18, which blocks all D.C. bias voltages which typically appear at operational amplifier outputs and lets only the amplified signal pass to the gate of the SCR 6. When the amplified signal reaches the specified trigger level of the SCR, the D.C. voltage difference across this SCR drops to zero. (The SCR shorts). This drop in voltage turns the relay coil 8 off, and turns the LED 9 on. With the relay coil off, the battery 7, is now disconnected from the trigger circuit by contact 13 and the headphones are switched off by the relay contacts 14 and 15. The LED will be activated by the voltage stored in capacitor 4 and its brightness will be determined by resistor 10 and the current rating of LED. When the voltage of capacitor 4 drops to a value which will no longer light the LED, the LED will turn off which in turn will cause the SCR to be deactivated (untriggered) and the difference in voltage across it will again turn on the relay coil 8. With the relay coil on, the headphones are operational and the circuit is ready to be retriggered, if need be, and repeat its cycle.

The circuitry of the embodiment of FIG. 2 includes all of the components and functions as described in the FIG. 1 embodiment with the exception of transformer 5. In FIG. 2 a voltage amplification means, amplifier 17, replaces transformer 5 of FIG. 1. The input of the amplifier is connected to the resistor network comprised of components 1, 2 and 3. The operational D.C. bias voltage is provided by connecting the appropriate amplifier terminals across the battery 7. As the amplified audio signal leaves said operational amplifier, the signal is fed through capacitor 18 to filter out any D.C. bias voltages which are typically present on the output of transistor amplifier components.

Thus, the circuitry of FIG. 2 includes means for isolating left and right audio channels; means for monitoring this isolated voltage level through a voltage amplifier 17, means for blocking D.C. bias voltages on the output of said operational amplifier by using a capacitor; means for coupling said audio voltage to the control terminal of semiconductor switch 6, so that exceeding the predetermined sound level causes relay contacts 14 and 15 to open causing interruption of audio signal to the transducers. Furthermore, FIG. 2 includes means for providing D.C. bias voltage to component 17, when power switch 16 closes to connect said operational amplifier across battery 7. The remaining operational functions and means of FIG. 2 components numbered 9, 10, 4, 11 and 12 are identical to that of FIG. 1.

Figure 3:
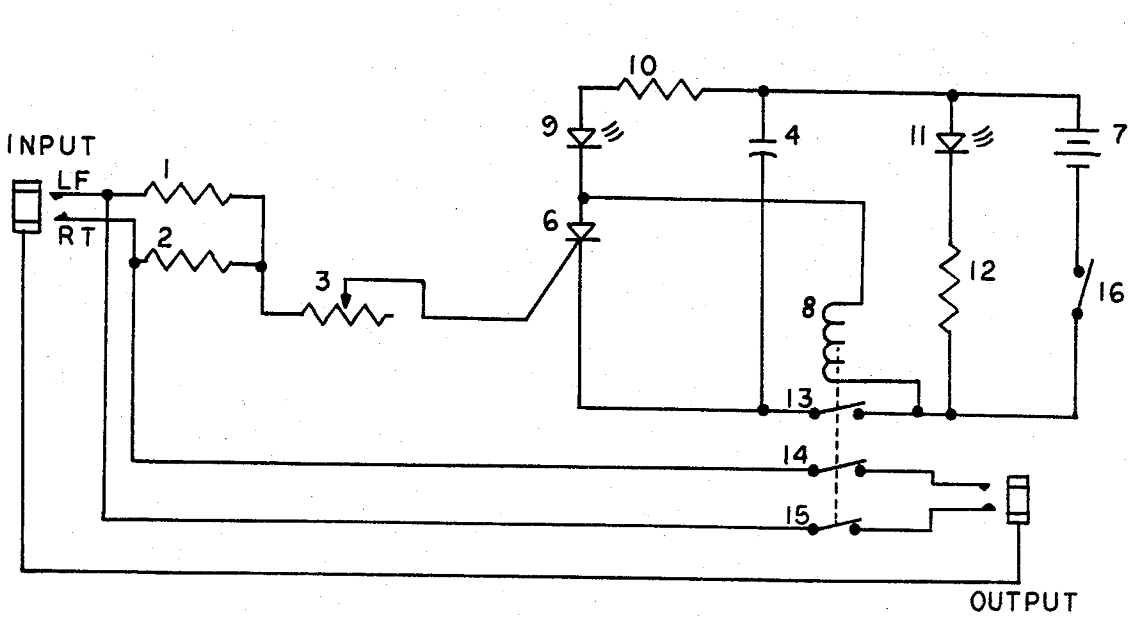
FIG. 3 shows another embodiment of the invention wherein no voltage increasing means is employed.

In the embodiment shown in FIG. 3 there is no means for increasing the audio voltage as previously shown in FIG. 1 and FIG. 2. With no means for increasing the audio voltage, it is necessary that the control terminal of the semiconductor switch have enough sensitivity to allow the audio voltage cutoff level to be low enough so that the protection circuit can perform as intended.

The circuitry embodiment in FIG. 3 includes all of the means and functions of the components shown in FIG. 1 with the exception of the transformer 5. FIG. 3 includes means for the direct connection of isolating resistors 1 and 2 and optional variable resistor 3 wherein the audio signal is fed directly to the control gate of the semiconductor switch 6.

Figure 4:
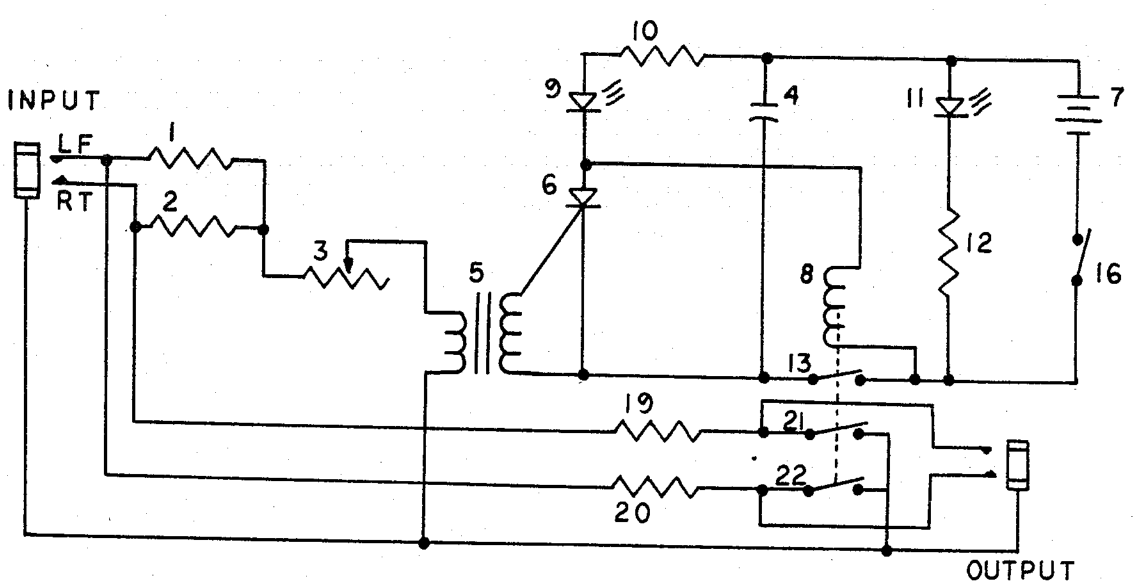
FIG. 4 shows still another embodiment of the invention where the means to prevent the audio signal from reaching the transducer load includes means for shorting the audio signal before it reaches the transducer load and providing a substitute load.

FIG. 4 shows another embodiment of the invention wherein the means for preventing the audio signal from reaching the transducer load includes a means for shorting the audio signal in response to a voltage level that is high enough to cause the semiconductor switch to activate the relay contacts 13, 21 and 22 causing the left and right audio signals to short to common. Included in this embodiment are resistors 19 and 20 which provide a substitute load for the radio or cassette amplifier in the event that the protection circuit turns the sound off going to the transducers by shorting the signals to common as is described in this embodiment.

The means for audio voltage isolation are resistors 1 and 2 which are connected to optional variable resistor 3 as per FIGS. 1, 2 and 3. Voltage increasing means, if required, can be a step up transformer 5, as described in FIG. 1 or an operational transistor amplifier, 17 as described in FIG. 2. The means for triggering the relay coil 8 is the same as the means described in FIG. 1 and furthermore, the resetting means and indicator LED's 9 and 11 perform in a similar mode as described in FIG. 1.

The difference in the embodiment of FIG. 4 is that means for connecting the audio signal through series resistors 19 and 20 are provided. Resistors 19 and 20 have a relatively low resistance in relation to the transducer level. Means are further provided wherein two isolated contacts on a relay (21 and 22) are directly in parallel with the separate respective left and right sides of the audio signal on the transducers so that exceeding a predetermined voltage level closes both contacts thereby shorting out said left and right audio signals to common and causing interruption of said audio signals to said transducer load.

We claim:

1. A protection circuit for limiting the sound pressure level provided by a transducer load but otherwise not interfering with the flow of audio signal current to said transducer load comprising:

(a) audio signal prevention means to immediately prevent audio signal current from reaching the transducer load which includes:
   (i) means to sense voltage applied to the transducer load, and
   (ii) means to increase said voltage, and
   (iii) means to use said increased voltage when it exceeds a predetermined level to immediately prevent the audio signal current from reaching the transducer load, (b) audio signal reestablishment means to reestablish the audio signal current to the transducer load after a fixed interval of time, and (c) audio signal reprevention means to again prevent the audio signal current from reaching the transducer load in the event that said increased voltage still exceeds said predetermined level, and (d) repeating means to repeat the functions described in subparagraphs (b) and (c) above sequentially until said increased voltage does not exceed said predetermined level at which time said audio signal is allowed to reach the transducer load.

2. A protection circuit according to claim 1 in which the means to increase said voltage is a step-up transformer.

3. A protection circuit according to claim 1 in which the means to increase said voltage is a transistor amplifier semiconductor.

4. A protection circuit according to claim 1 in which said voltage increasing means is provided after isolating resistors and is connected to the voltage sensing control terminal of a semiconductor switch.

5. A protection circuit according to claim 4 in which the means to prevent the audio signal from reaching the transducer load includes a semiconductor switch which is electronically open during normal listening through the transducer load but switches closed when the voltage through it exceeds said predetermined level.

6. A protection circuit according to claim 5 in which said semiconductor switch is a silicon control rectifier.

7. A protection circuit according to claim 5 in which the means to prevent the audio signal from reaching the transducer load includes means for shorting said audio signal before it reaches the transducer load and providing a substitute load.

8. A protection circuit according to claim 1 in which the audio signal prevention means and audio signal reprevention means are triggered when the voltage increases to a level exceeding the predetermined sound pressure level associated voltage.

9. A protection circuit according to claim 1 which includes a light emitting diode device to provide a visual signal when said increased voltage exceeds said predetermined level.

10. A protection circuit according to claim 1 in which the audio signal prevention means, the audio signal reestablishment means, the audio signal reprevention means and the repeating means, in combination, include:

(a) means for connecting two separate left and right audio signals from an amplifier output to a transducer load through normally open relay contacts, (b) means for controlling said relay contacts such that closing the contact on a power switch causes the relay contacts to close thereby allowing audio signal to pass through said relay contacts to said transducer load, and (c) means for connecting said audio signal to voltage isolating resistors, (d) means for coupling said audio signal to the control terminal of a voltage sensing semiconductor switch means so that exceeding a predetermined voltage level opens said relay contacts so as not to permit passage of audio signal to said transducer load, (e) timing means including an RC network in parallel with the anode and cathode of said semiconductor switch means to control the conducting state of the semiconductor thereby providing means to interrupt the audio signal through said relay contacts for a predetermined time as determined by said RC network, (f) D.C. power supply across said timing means and in series with said power switch contact and said relay contacts such that closing of the normally open switch contact permits operation of the protection circuit and the timing means for controlling the length of the audio signal interruption.

11. A protection circuit according to claim 10 wherein said timing means includes:

a capacitor in parallel with said D.C. power supply and in series with said normally open switch contacts, such that closing of said power switch contact permits charging of said capacitor to the D.C. voltage potential of said power supply and means connecting said capacitor through a resistor and said semiconductor switch, thereby creating a voltage potential across said semiconductor such that when the semiconductor is turned on in response to the D.C. voltage potential and when the predetermined voltage trigger level is reached at the control terminal of the semiconductor, the semiconductor conducts the voltage potential of the capacitor for a time determined by the time constant associated with said RC network and thus interrupts the audio signal by opening said relay contacts for the duration of the discharge of said capacitor.

12. A protection circuit according to claim 10 in which said voltage increasing means is provided after isolating resistors and is connected to the voltage sensing control terminal of a semiconductor switch.

13. A protection circuit according to claim 12 in which the means to increase said voltage is a step-up transformer.

14. A protection circuit according to claim 12 in which the audio signal prevention means and the audio signal reprevention means are triggered when the voltage increases to a level exceeding the predetermined sound pressure level associated voltage.

15. A protection circuit according to claim 11 which includes an indicator light in series with said semiconductor switch and said timing circuit to indicate the conductive state of said semiconductor corresponding to and indicating the interruption of the audio signal.

16. A protection circuit according to claim 11 which includes a variable resistor in series with said voltage isolating resistors and the control terminal of said semiconductor for means of adjustment of the audio voltage level to the control terminal of said semiconductor switch so as to enable the setting of the audio signal interruption at the desired predetermined audio voltage level.

17. A protection circuit according to claim 11 which includes an indicator light in series with said DC power supply and said switch contact to indicate the functional and operative state of the protection circuit, a resistor, and means for connecting said resistor in series with said indicator light, switch contact, and the power supply to control current flow to said indicator light.

18. The protection circuit according to claim 11 which includes:

(a) an indicator light in series with said semiconductor switch and said timing circuit means to indicate the conductive state of said semiconductor corresponding to and indicating the interruption of the audio signal, (b) a variable resistor in series with said voltage isolating resistors and the control terminal of said semiconductor for means of adjustment of the audio voltage level to the control terminal of said semiconductor switch, so as to enable the setting of the audio signal interruption at the desired predetermined audio voltage level, (c) an indicator light in series with said D.C. power supply and said power switch contact to indicate the functional and operative state of the protection circuit, a resistor, and means for connecting said resistor in series with said indicator light, power switch contact, and the power supply to control current flow to said indicator light.

19. A protection circuit according to claim 18 in which the transducer load includes headphones.

20. A protection circuit for limiting the sound pressure level provided by a transducer load but otherwise not interfering with the flow of audio signal current to said transducer load comprising:

(A) audio signal prevention means to immediately prevent audio signal current from reaching the transducer load which includes:

(i) means to sense voltage applied to the transducer load, and (ii) means to use said voltage when it exceeds a predetermined level to immediately prevent the audio signal current from reaching the transducer load, (B) audio signal reestablishment means to reestablish the audio signal current to the transducer load after a fixed interval of time, (C) audio signal reprevention means to again prevent the audio signal current from reaching the transducer load in the event that said voltage still exceeds a predetermined level, and (D) repeating means to repeat the functions described in subparagraphs (B) and (C) above sequentially until said voltage does not exceed said predetermined level at which time said audio signal is allowed to reach the transducer load.

which audio signal prevention means, audio signal reestablishment means, audio signal reprevention means and repeating means, in combination, include:

(a) means for connecting two separate left and right audio signals from an amplifier output to a transducer load through normally open relay contacts, (b) means for controlling said relay contacts such that closing the contact on a power switch causes the relay contacts to close thereby allowing audio signal to pass through said relay contacts to said transducer load, and (c) means for connecting said audio signal to voltage isolating resistors, (d) means for coupling said audio signal to control the terminal of a voltage sensing semiconductor switch means so that exceeding a predetermined voltage level opens said relay contacts so as not to permit passage of audio signal to said transducer load, (e) timing means including an RC network in parallel with the anode and cathode of said semiconductor switch means to control the conducting state of the semiconductor thereby providing means to interrupt the audio signal through said relay contacts for a predetermined time as determined by said RC network, and (f) D.C. power supply across said timing means and in series with said power switch contact and said relay contacts such that closing of the normally open switch contact permits operation of the protection circuit and the timing means for controlling the length of the audio signal interruption.

21. A protection circuit for limiting the sound pressure level provided by a transducer load comprising:

(A) audio signal prevention means to immediately prevent audio signal current from reaching the transducer load which includes:

(i) means to sense voltage applied to the transducer load, and (ii) means to use said voltage when it exceeds a predetermined level to immediately prevent the audio signal current from reaching the transducer load, (B) audio signal reestablishment means to reestablish the audio signal current to the transducer load after a fixed interval of time, (C) audio signal reprevention means to again prevent the audio signal current from reaching the transducer load in the event that said voltage still exceeds a predetermined level, and (D) repeating means to repeat the functions described in subparagraphs (B) and (C) above sequentially until said voltage does not exceed said predetermined level at which time said audio signal is allowed to reach the transducer load, which audio signal prevention means includes:

(a) means for connecting two separate left and right audio signals to the transducer load through two series resistors which have a relatively low resistance in relation to the transducer load, (b) means for connecting two isolated contacts of a relay directly in parallel with the respective said left and right audio signals so that exceeding a predetermined voltage level closes both contacts thereby shorting out said left and right audio signals to common and causing interruption of said audio signals to said transducer load, (c) means for connecting said audio signal to voltage isolating resistors, (d) means for coupling said audio signal to control the terminal of a voltage sensing semiconductor switch means so that exceeding a predetermined voltage level opens said relay contacts so as not to permit passage of audio signal to said transducer load, (e) timing means including an RC network in parallel with the anode and cathode of said semiconductor switch means to control the conducting state of the semiconductor thereby providing means to interrupt the audio signal through said relay contacts for a predetermined time as determined by said RC network, and (f) D.C. power supply across said timing means and in series with said power switch contact and said relay contacts such that closing of the normally open switch contact permits operation of the protection circuit and the timing means for controlling the length of the audio signal interruption.

* * * * *